United States Patent
Tanaka et al.

[15] 3,669,842

[45] June 13, 1972

[54] PURIFICATION OF L-ASPARAGINASE

[72] Inventors: Masao Tanaka; Tetuo Oka; Tatsuro Fujio, all of Machida-shi; Kazuo Mochizuki, Shizuoka-ken, all of Japan

[73] Assignee: Kyowa Hakko Kogyo Co., Ltd., Tokyo, Japan

[22] Filed: May 21, 1969

[21] Appl. No.: 826,665

[30] Foreign Application Priority Data

May 24, 1968 Japan..................43/34748

[52] U.S. Cl. ...........................................195/66 A
[51] Int. Cl..............................................C07g 7/028
[58] Field of Search ...........................195/66 A, 66

[56] References Cited

UNITED STATES PATENTS 3,440,142  4/1969  Teller .......................................195/66

3,511,755  5/1970  Ratych et al............................195/66

OTHER PUBLICATIONS

Rowley et al., Biochem. Bioplys Research Comm. Vol. 28 No. 2, pp. 160–165 (1967).

*Primary Examiner*—Lionel M. Shapiro
*Attorney*—Craig, Antonelli & Hill

[57] ABSTRACT

The present disclosure is directed to a process for purifying an enzyme preparation of L-asparaginase obtained from an L-asparaginase-producing microorganism belonging to the genus Serratia, wherein said microorganism produces together with the L-asparaginase, factors which inactivate the enzymatic activity of L-asparaginase; the improvement which comprises separating the inactivating factors from L-asparaginase during some stage of the purification process by salting out said factors with the addition of an inorganic salt and recovering purified L-asparaginase having an effective anti-tumor activity.

13 Claims, No Drawings

PURIFICATION OF L-ASPARAGINASE

The present invention relates to a process for obtaining an enzyme preparation of high purity by purifying a crude enzyme preparation of L-asparaginase obtained from cells of an L-asparaginase-producing strain belonging to the genus Serratia. More particularly, the present invention is directed to producing a purified enzyme preparation of L-asparaginase having anti-tumor activity by purifying crude L-asparaginase in a good yield on an economic and industrial scale.

L-asparaginase, that is, L-asparagine-amide hydrolase (the enzyme number being 3, 5, 1, 1) is an enzyme which hydrolyzes L-asparagine into L-aspartic acid and ammonia. It is relatively extensively distributed in the animal and plant worlds, but many of the details of its properties are yet unknown. In recent years, L-asparaginase has attracted much attention since it was discovered that the present enzymes, isolated from certain specific sources, for instance, serum asparaginase of a guinea pig, possess anti-tumor activity and a particularly strong activity against L-asparagine-requiring leukemic cells. However, heretofore, the production of this enzyme preparation having an anti-leukemic activity, particularly the production thereof for use as pharmaceuticals, was considered difficult, because there were many problems to be solved before such production could be started. Some of these problems include the fact that the kinds of anti-tumor L-asparaginase enzymes are limited and thus, said anti-tumor activity is recognized only in enzymes produced by a certain type of animal serums or Escherichia coli and that an enzymatic purification process from these sources of enzymes contains many problems. Therefore, a solution for these problems has been earnestly sought.

The first of the above-stated obstacles standing in the way of the industrial production of anti-tumor L-asparaginase was removed by using a submerged culture of microorganisms belonging to the genus Serratia. This has been disclosed in Japanese Patent Application 9116/1968. The present invention has succeeded in overcoming another obstacle concerning said purification process, after repeatedly investigating L-asparaginase produced by microorganisms belonging to the genus Serratia. Heretofore, very little has been known as to how to produce, in a good yield, purified L-asparaginase from cells of microorganisms belonging to the genus Serratia and to obtain an enzyme preparation usable as a pharmaceutical. It is known that the enzymes of the present microorganisms are extremely unstable and that a preparation of high purity cannot be obtained without carrying out all the processing steps very rapidly in purifying said enzymes. However, nothing is known about the reasons for said instability and accordingly, no basic solution has heretofore been known. (See Biochem. Biophys. Research Comm., Vol. 28 (2), pp. 160–165 [1967]).

Obviously, such purification process as mentioned above cannot be easily applied on an industrial scale and thus a practical utilization of L-asparaginase of the present microorganisms was hindered thereby. The present invention has developed a new understanding of these problems as a result of investigations directed to the properties of the present enzymes. Strains belonging to the genus Serratia produce concurrently with L-asparaginase a relatively strong factor which inactivates the present enzymatic activity. According to the present invention, it has been further found that said inactivating factors are extracted together when L-asparaginase is extracted by a conventional enzyme extraction method. Therefore, it is impossible to obtain a purified L-asparaginase preparation in a good yield unless said factors are removed because L-asparaginase loses its activity during the succeeding purification process. Accordingly, it is clear that an enzyme preparation containing said inactivating factors cannot provide a sufficient anti-tumor activity, even if one proceeds with purification without removing said inactivating elements. The present applicants have previously invented a purification process for L-asparaginase having the good yield by adjusting a liquid quality and adding various substances for removing said inactivating factors. Their invention is disclosed in the Japanese Patent Application 22328/1968, corresponding to U.S. Application Ser. No. 813,287, filed on Mar. 3, 1969, now U.S. Pat. No. 3,594,782, issued July 20, 1971. However, this purification process is still insufficient in separating the inactivating factors and also contains defects with respect to the production of a purified preparation usable as a pharmaceutical.

An object of the present invention is to avoid the prior art disadvantages in the purification of an enzyme preparation of L-asparaginase.

Another object of the present invention is to provide an improved process for purifying an enzyme preparation of L-asparaginase having anti-tumor activity on an economic and industrial scale.

Other objects and further scope of applicability of the present invention will become apparent from the detailed description given hereinafter; it should be understood, however, that the detailed description and specific examples, while indicating preferred embodiments of the present invention, are given by way of illustration only, since various changes and modifications within the spirit and scope of the invention will become apparent to those skilled in the art from this detailed description.

According to the present invention it has been found that a substantially perfect separation of the inactivating factors from L-asparaginase is possible by a salting-out method, particularly by a fractional precipitation method using ammonium sulfate. Thus, the present invention has established a process for producing L-asparaginase having a practical anti-tumor activity. The process for purifying L-asparaginase according to the present invention is an industrial process which is characterized by utilizing a fractional precipitation treatment by means of salting out with ammonium sulfate in any step of a purification process, preferably in an early step thereof, wherein L-asparaginase is purified from cultured cells of an L-asparaginase-producing microorganism belonging to the genus Serratia. Prior to the present invention, it was not known that in purifying L-asparaginase produced by microorganisms belonging to the genus Serratia a separation of inactivating factors was possible by a salting-out method and also that said salting-out method can be effectively utilized as a method for purifying L-asparaginase. The present invention is a novel process based on these concepts.

The salts which can be used in the salting out step of the present invention include inorganic salts such as sodium chloride or ammonium sulfate. However, salting out with ammonium sulfate is particularly effective. The salts are added to the crude enzymatic aqueous solution in the form of an aqueous solution of said salt. As an enzyme preparation of L-asparaginase to be salted out, there is used a cell extract of microorganisms belonging to the genus Serratia, a solution obtained from said extract by removing nucleic acids with the addition of $Mn^{++}$ ions, a crude enzyme solution obtained by precipitating impurities by acidifying said extract liquid or a partially purified enzyme solution obtained by treating the above-said solution by means of chromatography with DEAE-cellulose (diethyl amino ethyl-cellulose) or CM-cellulose. Better results can be achieved when said salting-out process is carried out at as early a stage of purification as is possible and applied to a solution free of nucleic acids and when a solution free of impurities due to acidic precipitation. As for the temperature used for said salting-out treatment, the yield is improved as the temperature is lowered, but ordinarily, it is practical to carry out the processing within a temperature range of from 0° C. to −5° C. A wide range of pH of from about 3 to 10 can be used for said salting-out treatment, but it is desirable to conduct said salting-out treatment either at a pH of about 4.0 or a pH of about 9.0.

As a salting-out method to be employed in the process of this invention, the following method can be employed. A salt, advantageously ammonium sulfate, is added to an enzymatic aqueous solution to a point of 0.3 saturation or 30 percent by weight of the amount required for saturation, and the fraction salted out by this addition is removed by centrifugal separation or filtration. To the thus-obtained supernatant liquid, ammonium sulfate is further added to a point of 0.5 saturation and to the fraction thereby salted out, L-asparaginase activity is precipitated, which activity is recovered by centrifugal separation or filtration. With this processing, L-asparaginase is almost completely recovered but inactivating factors are not precipitated in said fraction and thus the L-asparaginase is separated from the inactivating factors.

The table below compares the stability of L-asparaginase contained in the preparations before and after the salting-out treatment and it makes it clear that the inactivating factors are separated by said salting-out treatment. In this table, a cell extract of Serratia marcescens ATCC 60 is processed by a method described in the following Example 1. Said table compares the stability of the thus-obtained samples before and after precipitates are formed with an addition of ammonium sulfate, by showing a reduction of activity measured at various values of pH, at a temperature of 20° C. and over a period of 12 hours. The activity of an original solution used in the tests of the table was 2.51 units/ml. The table shows the residual activity after 12 hours as mentioned above. A smaller residual activity in the table means a larger loss of activity. An activity which decomposes 1 $\mu$ (mole) of L-asparagine per minute to L-aspartic acid and ammonia is hereinafter expressed as one unit.

Table: Effect of fraction with ammonium sulfate on the stability of L-asparaginase.

| | Residual enzymatic activity (unit/ml.) | | | | | |
|---|---|---|---|---|---|---|
| pH | 9.0 | 8.5 | 8.0 | 6.0 | 5.0 | 3.5 |
| Sample Before fractionation | 2.01 | 0.98 | 0.33 | 0.21 | 1.06 | 2.47 |
| After fractionation | 2.49 | 2.51 | 2.50 | 2.48 | 2.45 | 2.40 |

The largest loss of L-asparaginase activity due to L-asparaginase inactivating factors occurred in a neutral pH range, but samples already fractionated with ammonium sulfate were very stable even in a neutral pH range. This shows that the inactivating factors were completely removed from these samples.

With this salting-out process using ammonium sulfate, L-asparaginase is usually purified to a purity two to three times higher than that of a starting preparation. The purity of the thus-obtained preparations from which the inactivating factors are removed can be easily raised further with the various methods commonly employed for the purification of enzymes, such as ion-exchange chromatography or adsorption chromatography. In this way, an L-asparaginase preparation which is usable as a pharmaceutical can be obtained in a good yield.

In the following, the present invention will be illustrated by means of examples, but these are only illustrative and do not restrict fractionation using ammonium sulfate.

EXAMPLE 1

Serratia marcescens ATCC 60 is cultivated in a liquid medium and the thus-grown cells are separated by centrifugation, whereby wet cells are obtained. Said wet cells are suspended in a 0.01 M tris-HCl buffer solution with a pH of 8.5 and homogenized and extracted with a supersonic wave generator of 10 KC for 10 minutes and thereafter subjected to a centrifugal separation. The thus-obtained supernatant solution is collected to obtain a crude enzymic extract having a specific L-asparaginase activity of 0.15 unit per 1 mg. of protein (the specific activity is expressed similarly hereinafter on the same basis as used here). To this extract solution, $MnCl_2$ is added to a concentration of 0.05M. Thereafter, said solution is heated at a temperature of 50° C. for 15 minutes and the thus formed precipitates are removed by centrifugal separation, whereby a crude enzymatic solution free of nucleic acids is obtained.

To 10 liters of said crude enzymatic liquid free of nucleic acids (a total activity of 10,000 units), is dissolved well-pulverized ammonium sulfate by adding it slowly at a temperature of 0° C. and to a concentration of 0.3 saturation. The precipitates formed by said addition are removed by centrifugal separation.

To the thus-obtained supernatant liquid, ammonium sulfate is further added and dissolved therein to a concentration of 0.5 saturation and the resultant solution is left to stand for cooling overnight. Precipitates thus formed are collected by centrifugal separation to obtain a crude protein having a wet weight of 15 g. Said crude protein has a specific activity of 2.3, a total activity of about 9,000 units and contains absolutely no inactivating factors of L-asparaginase. The activity of the crude protein is extremely stable at each pH value at a temperature of 60° C. or less and almost no loss of activity is recognized during the succeeding purification processings.

This partially purified enzyme preparation is again dissolved in the aforementioned buffer solution and subjected to chromatography using DEAE-cellulose (diethyl amino ethyl cellulose), biogel and the like, whereby a purified L-asparaginase preparation is obtained having a specific activity of 105 with an activity yield of about 25 percent. The thus-obtained L-asparaginase preparation demonstrated an anti-tumor activity which completely cured an experimental leukemia of a mouse with a dosage of several $\mu$g.

EXAMPLE 2

Serratia marcescens, ATCC 19180 is cultivated and subjected to the same processings as described in Example 1, whereby a crude enzymatic extract having a specific L-asparaginase activity of 0.11 is obtained. The pH value of said extract is adjusted to 4.0 at a temperature of 0° C. and the precipitates thus formed are removed by centrifugal separation, whereby a supernatant having a specific activity of 1.0 is obtained as a result of said acidic precipitation. To 16 liters of said supernatant liquid containing a total activity of 2,700 units of L-asparaginase, ammonium sulfate is added and dissolved therein in the same way as in Example 1 to a concentration of 0.2 saturation. Precipitates thus formed are removed and a supernatant liquid is again collected. To this supernatant, ammonium sulfate is added to a concentration of 0.6 saturation, whereby L-asparaginase is recovered by centrifugal separation. The specific activity of the thus-obtained crude protein is 1.58, but a yield rate of activity is almost quantitative and said crude protein contained absolutely no inactivating factors of L-asparaginase.

This partially purified preparation is treated with DEAE-cellulose, whereby a preparation having a specific activity of 21 is obtained in a yield of about 70 percent. Said preparation is effective against leukemia of a mouse in the same way as the enzyme preparation obtained in the Example 1.

The invention being thus described, it will be obvious that the same may be varied in many ways. Such variations are not to be regarded as a departure from the spirit and scope of the invention and all such modifications as would be apparent to one skilled in the art are intended to be included.

What is claimed is:

1. In a process for purifying an enzyme preparation of L-asparaginase obtained from an L-asparaginase-producing microorganism belonging to the genus Serratia, wherein said microorganism produces, together with the L-asparaginase, factors which inactivate the enzymatic activity of the L-asparaginase, the improvement which comprises separating the inactivating factors from the L-asparaginase during the purification process comprising the steps of (1) adding an aqueous solution of an inorganic salt to a saturation point of from about 0.2 to about 0.3 to a solution of the enzyme containing said inactivating factors and removing the fraction precipitated thereby, (2) adding the aqueous solution of said inorganic salt to a saturation point of from about 0.5 to about 0.6 to the remaining supernatant liquid, and (3) recovering the purified L-asparaginase from the resulting precipitated fraction.

2. The process of claim 1, wherein the salting-out treatment is carried out at an early stage of the purification process.

3. The process of claim 1, wherein the salting-out treatment is conducted at a temperature of about 0° C. to −5° C. and a pH of about 3 to 10.

4. The process of claim 1, wherein the microorganism is Serratia marcescens, ATCC 60.

5. The process of claim 1, wherein the microorganism is Serratia marcescens, ATCC 19180.

6. The process of claim 1, wherein the salting-out treatment is conducted at a pH of about 4 or a pH of about 9.

7. The process of claim 1, wherein the inorganic salt is ammonium sulfate.

8. The process of claim 1, wherein the precipitated fraction obtained in step (1) is removed by centrifugal separation or filtration.

9. The process of claim 1, wherein the salting out steps are conducted with a partially purified L-asparaginase enzymatic solution.

10. The process of claim 9, wherein the partially purified L-asparaginase enzymatic solution is obtained by adding manganese ions to a cell extract of said Serratia microorganism.

11. The process of claim 9, wherein the partially purified L-asparaginase enzymatic solution is obtained by acidifying a cell extract of said Serratia microorganism.

12. The process of claim 9, wherein the L-asparaginase enzymatic solution is first subjected to a chromatographic treatment prior to said salting out steps.

13. The process of claim 1, wherein the inorganic salt is sodium chloride.

* * * * *